United States Patent [19]

Fitko, deceased

[11] Patent Number: 4,478,667

[45] Date of Patent: Oct. 23, 1984

[54] METHOD FOR EFFECTING HEAT SEALS OF CONTROLLED DETACHABILITY BETWEEN PROPYLENE POLYMERS AND ENAMEL COATED SURFACES

[75] Inventor: Chester W. Fitko, deceased, late of Chicago, Ill., by Clare B. Fitko, administrator

[73] Assignee: The Continental Group, In., Stamford, Conn.

[21] Appl. No.: 246,815

[22] Filed: Mar. 23, 1981

Related U.S. Application Data

[63] Continuation of Ser. No. 112,669, Jan. 16, 1980, abandoned.

[51] Int. Cl.$^3$ .............................................. C09J 5/02
[52] U.S. Cl. ................................ 156/307.3; 156/247; 156/315; 156/330; 156/331.3; 156/344; 427/374.1; 427/386; 427/388.1; 427/410; 428/416; 428/418; 525/108; 525/110
[58] Field of Search .................... 427/384, 386, 388.1, 427/376.2, 374.1, 379, 374.4, 380, 409, 154, 410, 156, 419.6; 428/416, 418, 457, 461; 156/330, 334, 247, 307.3, 331.3, 315, 344; 525/108, 110

[56] References Cited

U.S. PATENT DOCUMENTS

| | | | |
|---|---|---|---|
| Re. 30,006 | 5/1979 | Sakayori et al. | 427/410 |
| 3,292,828 | 12/1966 | Stuart | 220/260 |
| 3,392,045 | 7/1968 | Holub | 428/418 |
| 3,616,047 | 10/1971 | Kehe | 156/334 |
| 3,972,821 | 8/1976 | Weidenbenner | 525/108 |
| 3,990,615 | 11/1976 | Kerwin et al. | 222/541 |
| 4,012,270 | 3/1977 | Fitko | 427/410 |
| 4,034,132 | 7/1977 | Manuel | 427/410 |
| 4,048,355 | 9/1977 | Sakayori et al. | 427/410 |
| 4,169,822 | 10/1979 | Kutch et al. | 525/108 |
| 4,177,323 | 12/1979 | Obi et al. | 428/418 |

FOREIGN PATENT DOCUMENTS 2455443  5/1975  Fed. Rep. of Germany ...... 427/410

*Primary Examiner*—S. L. Childs
*Attorney, Agent, or Firm*—Paul Shapiro

[57] ABSTRACT

A seal of controlled detachability between a propylene polymer, such as polypropylene, heat sealed to an enamel coated surface comprised of an epoxy resin, an aminoplant resin and an adhesion promoting amount of a carboxylated polypropylene resin, is obtained by incorporating a butene polymer such as polybutene in the enamel coating composition prior to its application to a metal surface.

19 Claims, No Drawings

4,478,667

METHOD FOR EFFECTING HEAT SEALS OF CONTROLLED DETACHABILITY BETWEEN PROPYLENE POLYMERS AND ENAMEL COATED SURFACES

This is a continuation of Ser. No. 112,669, filed Jan. 16, 1980, now abandoned.

BACKGROUND OF THE INVENTION

1. Field of the Invention

This invention relates generally to bonding a propylene polymer layer to an enamel coated metal surface and more particularly to effecting a seal of controlled detachability between the bonded surfaces.

2. Prior Art

Easy opening containers are known to the art. These containers are generally formed of metal and are provided with a pour opening. The pour opening generally occupies only a portion of the end panel of the container. Heretofore, the pour opening has generally been formed by scoring to define a tear strip. A pull tab is attached to the tear strip, and upon the application of a force, the pull tab is operative to separate the tear strip along the weakening line from the panel.

Although easy opening containers have been readily accepted by the public, deficiencies still remain in this type of container. One of these deficiencies is that the removable tear strip which is torn from the can end in the opening of the can has sharp edges and, when thrown on the ground or otherwise improperly disposed of, remains as a nuisance which presents a cutting hazard to the public.

It has been proposed U.S. Pat. Nos. 3,292,828, 3,990,615 to replace the metal tear strip of easy opening containers with a plastic closure member which will eliminate the cutting hazard in that the removed portion does not have sharp edges on which a person may be cut. In these containers a tape strip is fabricated from a thermoplastic resin, such as polypropylene or a metal foil coated with the resin is detachably and sealably secured to the outer periphery of a preformed pour opening in the end panel of the container by bonding with a suitable adhesive. Container end panels used for pressurized beverages such as beer and soft drinks have been coated with a heat activatable adhesive layer such as a carboxylated polypropylene resin to provide a surface for bonding tape strips of the type described to the enamel coated surface of the container end panel to seal the preformed pour opening, e.g., U.S. Pat. No. 3,616,047, whereby the tape strip is heat sealed to and fixed about the periphery of the opening until a pulling force is applied thereto.

In U.S. Pat. No. 4,034,132 there is disclosed an easy opening container wherein the preformed opening of an enamel coated metal end panel is sealed with a tape strip provided with a heat activatable propylene polymer bonding layer which is heat sealed to the enamel coated end panel, the enamel coating having incorporated therein a bond promoting concentration of a carboxylated polypropylene resin.

Although the method disclosed in U.S. Pat. No. 4,034,132 is highly effective for bonding the tape strip to the can end, it has been determined upon further experimentation that if, during the application of the enamel coating to the end panel, the applied coating is overbaked during the curing and hardening step involved in the coating application, a wide variance in the strength of the heat seal bond or peel strength of the tape strip is encountered. For example, after an uncured epoxy resin based enamel coating formulation is applied to the metal end, the end is conveyed through an oven at 415° F. for 10 minutes to harden the coating. If for any reason the exposure time of the end in the oven is extended substantially beyond the 10-minute period, the bondability or peel strength of the tape strip subsequently applied to the end has been found to vary over wide ranges and frequently will be lowered or raised to values which are unacceptable for commercial use. A commercial acceptable peel value when measured using a standardized test is in the range of 4 to 9 pounds per lineal inch (PLI). If the peel value of a tape strip used to seal containers in which carbonated beverages are packaged has a peel value below 4 PLI, the internal pressure generated by the carbonated beverage within the container will cause leakage of the product through the pour opening at the seal area. If the peel value is in excess of 9 psi, the force required by the consumer to effect the removal of the tape strip is too high for consumer acceptance.

In order for containers provided with the above discussed tape strip sealed end to obtain rapid consumer acceptance, it is necessary that the tape strip consistently and properly seal the pour opening in the container end, and when removal of the closure is attempted, the closure be readily separable from the can end.

SUMMARY OF THE INVENTION

In accordance with the present invention, in heat sealing a propylene polymer layer to an enamel coated metal surface wherein the enamel contains an adhesion promoting amount of a carboxyl modified polypropylene resin, the bond strength of the seal is stabilized to heat by the incorporation in the enamel of a small but effective amount of a butene polymer resin.

By the practice of the present invention the wide variation in the bond strengths encountered with propylene polymer layered tape strips heat sealed to enamel coated metal ends are substantially reduced and limited to ranges which are required for commercial acceptance.

PREFERRED EMBODIMENTS

The enamel coating composition used in the practice of the present invention is generally an epoxy resin coating formulation containing a heat activatable aminoplast cross-linking resin to which small amounts of a bond promoting carboxylated polypropylene resin and a heat seal stabilizing butene polymer have been incorporated.

Epoxy resins used in the preparation of the enamel coating formulation are the polymeric reaction products of polyfunctional holohydrins with polyhydric phenols having the structural formula:

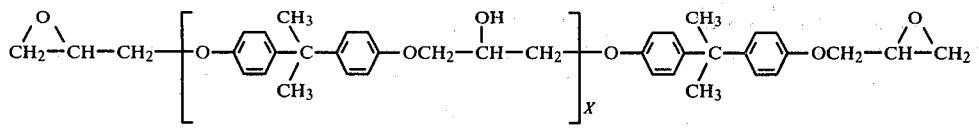

wherein X represents the number of molecules condensed. Typical polyfunctional halohydrins are epicholorohydrin, glycerol, dichlorohydrin, and the like. Typical polyhydric phenols are resorcinol and a 2,2-bis (4-hydroxyphenyl)alkane, the latter resulting from the condensation of phenols with aldehydes and ketones, including formaldehyde, acetaldehyde, propionaldehyde, acetone, methyl ethyl ketone and the like, which result in such compounds as 2,2-bis (4-hydroxyphenyl propane and like compounds. These eposy resins normally contain terminal epoxy groups but may contain terminal epoxy groups and terminal hydroxyl groups.

The molecular weight of the epoxy resins may be controlled by the relative proportions of the reactants as well as by the extent to which the reaction is carried.

In the present invention, those epoxy resins which are of relatively high molecular weight are utilized in preparing the enamel coatings. Generally, epoxy resins having an average molecular weight in the range of 1400 to 5000 may be used. Preferred resins being the condensation products of epichlorohydrin and Bisphenol A (dihydroxydiphenyl-dimethylmethane).

The aminoplast condensates employed in the present invention are urea-aldehyde and triazine aldehyde resins and alcohol modified derivatives thereof, that is, alkylated amino resins wherein the alkyl radical contains from 2 to 8 carbon atoms. Such aminoplast resins are the reaction products of aldehydes, for instance formaldehyde, acetaldehyde and the like, with urea, substituted ureas, thioureas, ethylene urea, memaline, benzoquanamine, acetoquanamine and the like. The resulting methylol substituted products are etherified with alcohols, for example isopropanol, butanol and 2-ethyl hexanol, in order to obtain stability and organic solubility. Such organic soluble aminoplast resins are contemplated for use in this invention and butylated urea formaldehyde resins are preferred for use in the enamel coatings of the present invention.

The butene polymers suitable for use as heat stabilizing adjuvants in the present invention are commercially available products and are prepared by the polymerization of butene. The butene polymers useful in the practice of the present invention are polybutenes and polyisobutylenes which have a relatively wide molecular weight range of from about 300 to 2500 molecular weight and preferably in the molecular weight range of about 300 to about 1000. It has been found that butene polymers of either very low molecular weight, e.g., substantially below 300, or very high molecular weight, e.g., substantially above 2500, are less suitable for use in accordance with the present invention as these polybutenes have limited solubility in the enamel formulations in which they are incorporated.

The carboxylated polypropylene resin which is utilized in the practice of the present invention is prepared by grafting an unsaturated dicarboxylic acid or anhydride onto a polypropylene backbone using high energy radiation or a peroxy catalyst as described in British Patent 1,020,740. Unsaturated dicarboxylic acids or anhydrides which can be employed to prepare the carboxyl modified polypropylene resins include maleic, tetrahydrophthalic acid, fumaric acid, itaconic, nadic, methylnadic and their anhydrides, maleic anhydride being preferred.

The amount of unsaturated dicarboxylic acid or anhydride which can be grafted onto the polypropylene backbone ranges from about 0.05 to about 10 percent by weight based on the total weight of the grafted polymer and preferably the amount of grafted dicarboxylic acid or anhydride ranges from about 0.1 to about 5.0 percent.

When the carboxyl modified polypropylene resin is utilized as an adhesion promoting adjuvant for enamel coatings, the resin can be of any particle size and generally has a particle size of 0.05 to 50 microns and preferably a particle size of 35 to 40 microns.

The solids content of the enamel coating compositions of the enamel coatings of the present invention are comprised of about 70 to about 90 percent by weight of the epoxy resin, preferably about 75 to about 85 percent by weight of the epoxy resin and about 5 to about 20 percent by weight of the aminoplast resin, preferably about 10 to 15 percent by weight of the aminoplast resin, and about 0.05 to 5 percent by weight of the carboxyl modified polypropylene resin, preferably about 1.0 to about 3 percent by weight of the carboxyl modified polypropylene resin, and about 0.5 to 10% by weight of the butene polymer and preferably about 1.5 to 7.5 percent by weight of the butene polymer. Within the designated concentration range for the butene polymer adjuvant, the amount of butene polymer incorporated in the enamel will be inversely proportional to its molecular weight, e.g., a lower concentration of the higher molecular weight butene polymer will be incorporated in the enamel coating composition as compared with a lower molecular weight butene polymer.

In preparing the enamel coating compositions of the present invention, the epoxy resin and the aminoplast resin components are dissolved in a solvent blend, such as a mixture of ketones and aromatic hydrocarbons until these components are completely dissolved.

Suitable ketones which can be employed as solvents for epoxy resin-aminoplast resin based enamel coating formulations include methyl ethyl ketone, methyl isobutyl ketone, isophorone, cyclohexanone, diacetone alcohol and diisobutylketone. Aromatic hydrocarbon solvents useful as solvents for epoxy resin-aminoplast resin based enamel coating formulations include benzene, toluene, xylene, and commercially available aromatic naptha mixtures, such as Solvesso 100 or 150. An example of a useful ether alcohol is butyl cellosolve and an example of a useful ether alcohol ester is cellosolve acetate.

Antioxidants and thermal stabilizers may also be incorporated in the epoxy resin-aminoplast resin formulation to inhibit oxidation of the carboxyl modified polypropylene resin during the baking and curing of the enamel coating after its application to metal surfaces. Antioxidant compounds which have been found useful in the practice of the present invention include hindered phenolic compounds such as Irganox 1010, tetrakis [methylene 3-(3′, 5′-di-tert-butyl-4-hydroxyphenyl)propionate], which are incorporated in the enamel coating formulations at concentrations in the range of about 0.1 to 1.0 percent by weight based on the solids content of the enamel. Lubricants such as polyethylene dispersions may also be incorporated in the enamel which are required during forming of the enamel coated metal sheet in container end manufacture.

Following the procedure of U.S. Pat. No. 4,012,270, the carboxylated polypropylene resin is preferably first dissolved in a hot, e.g., greater than 100° C., organic solvent selected from aliphatic alcohols, acids and hydrocarbons containing at least 10 carbon atoms.

The carboxylated polypropylene resin is added to the organic alcohol, acid or hydrocarbon solvent at a concentration of about 1 to about 30 percent by weight and preferably about 2 to about 10 percent by weight. After the resin is added to the solvent, the mixture is heated to a temperature above 100° C. until the resin completely dissolves in the solvent. The carboxylated polypropylene resin solution is then added to the epoxy-aminoplast resin formulation to prepare the enamel coating composition.

Prefereably the carboxylated polypropylene is at temperature above 100° C. when added to the enamel coating formulation.

Organic alcohols used to prepare solutions of the carboxylated polypropylene resin for incorporation in the epoxy-aminoplast resin formulations to prepare the enamel coating formulations of present invention are long chain, saturated and unsaturated, aliphatic monohydroxy alcohols having the general formula R-OH where R is a straight or branched chained saturated or olefinic unsaturated hydrocarbon group having from 10 to 30 carbon atoms and preferably from 12 to 22 carbon atoms. Illustrative of such alcohols are decyl alcohol, tridecyl alcohol, lauryl alcohol, tetradecyl alcohol, cetyl alcohol, oleyl alcohol, linoleyl alcohol, palmitoleyl alcohol, arachidyl alcohol, stearyl alcohol, benhenyl alcohol, arachidonyl alcohol, myristoleyl alcohol and mixtures of these alcohols.

Organic acids which may be used as solvents for the carboxylated polypropylene resin include saturated and olefinic unsaturated aliphatic acids having 10 or more carbon atoms and preferably 12 to 22 carbon atoms such as the fatty acids as capric acid, lauric acid, myristic acid, palmitic acid, isostearic acid, stearic acid and arachidic acid, undecylemic acid, myristoleic acid, palmitoleic acid, oleic acid, cetoleic acid and euric acid and mixtures of these acids.

Aliphatic hydrocarbons having 10 or more carbon atoms which may be used as solvents for the carboxylated polypropylene resin include saturated hydrocarbons such as decane, iodecane, pentadecane, nepthadecane, nonadecane and mixtures of these hydrocarbons such as kerosene and mineral oil as well as unsaturated hydrocarbons and particularly unsaturated hydrocarbons having olefinic unsaturation such as undecene, tridecene and pentadecene.

The enamel compositions of this invention can be satisfactorily applied at a solids content ranging from about 20 percent to about 70 percent by weight, based on the total weight of the liquid enamel coating composition. Generally, a solids content of 30 to 50 percent by weight is preferred.

The enamel coating compositions of the present invention can be satisfactorily applied by any of the conventional methods employed in the coating industry. However, for coating of sheet metal used in container manufacture, gravure or direct roller coating are preferred methods, as the desired coating weight is easily and conventionally applied in a single coat. Spraying, dipping and flow coating are also useful methods of applying the coating dispersion.

After applying the enamel coating, it is cured and hardened by heating the coated substrate at a temperature of about 350° F. to about 500° F. for a period of about 20 minutes to about 1 minute, the preferred conditions being 8-10 minutes at 415° F.

The preferred coating weight for coating metal ends to which a propylene polymer layer of a tape seal closure may be heat sealed is in the range of 2.5 to 10.0 milligrams of dry coating per square inch of substrate surface to provide an enameled surface to which the propylene polymer layer can be heat sealed.

Propylene polymer layers which may be bonded to the enamel coated surface in accordance with the practice of the present invention include polypropylene, and propylene/ethylene copolymers containing about 1 to 10 percent ethylene.

The propylene polymer layer is bonded to carboxyl modified polypropylene coated surface by heat sealing at a temperature range of about 350° to 400° F. Heat sealing may be accomplished by any means known to the art, such as a hot platen press or metal jaws heated by resistance wire or by induction heating, using dwell times varying from 0.1 seconds to 5 seconds.

After the propylene polymer layer is heat sealed and bonded to the enamel coated metal surface, the assembly is allowed to cool to ambient temperature.

To illustrate the manner in which the present invention may be carried out, the following Examples are given. It is to be understood, however, that the Examples are for the purpose of illustration, and the invention is not to be regarded as limited to any of the specific materials or conditions recited therein.

EXAMPLE I

An epoxy resin based enamel coating formulation was prepared composed of a 40 percent by weight solids consisting of 85 parts of the digycidyl ether of Bisphenol A and 15 parts of a butylated urea formaldehyde suspended in an organic solvent mixture of 25 parts xylene, 25 parts methyl isobutyl keton, 30 parts diacetone alcohol and 20 parts butyl alcohol. To 150 parts of the enamel coating formulation was added Hercoprime A-35 (trademark) in the form of a hot solvent solution in ALFOL 1216.

The hot solvent solutions were prepared by adding 0.6 parts of the Hercoprime A-35 to 10 parts ALFOL 1216 (trademark) to prepare resin solutions having a concentration of 6 percent by weight. Hercoprime A-35 is a maleic anhydride modified polypropylene resin having an inherent viscosity of about 1.7, a carboxyl content of 0.6 percent to 1.0 percent, a particle size range of 35 to 40 microns and a specific gravity of 0.9.

ALFOL 1216 is a mixture of $C_{12}$-$C_{16}$ aliphatic alcohols having the following composition:

| Alcohol | Wt. % |
|---|---|
| Dodecyl ($C_{12}$) | 66 |
| Myristyl ($C_{14}$) | 24 |
| Cetyl ($C_{16}$) | 8 |

The ALFOL 1216-Hercoprime mixture was heated to 165° C. for 2 hours during which time the Hercoprime dissolved in the ALFOL. The hot solution at 165° C. was then added slowly to a rapidly stirred solution of the 150 parts of an epoxy resin based enamel coating formulation.

To the carboxylated polypropylene modified enamel coating formulation was added concentrations of butene polymer varying from 1.5 to 7.2 percent by weight based on the solids content of the enamel coating formulation were added to the formulation as a solution in methylethyketone at a concentration of about 33 percent by weight. The physical properties of the butene polymers are listed below:

| PHYSICAL PROPERTIES | L14 | L50* | L100 | H100 | H1900 |
|---|---|---|---|---|---|
| Avg. Molecular Weight | 320 | 420 | 460 | 920 | 2300 |
| Viscosity | | | | | |
| CS @ 100° F. | 30 | 109 | 218 | — | — |
| CS @ 210° F. | — | — | — | 213 | 4225 |
| Pour Point °F. | −60 | −40 | −30 | +20 | +65 |
| Fire Point °F. | 310 | 325 | 330 | 450 | 585 |
| Specific Gravity 60/60 | 0.837 | 0.851 | 0.857 | 0.890 | 0.906 |
| Density lbs/gal | 6.97 | 7.08 | 7.14 | 7.41 | 7.55 |

*Polybutene

Thereafter 38.8 parts of cellosolve acetate was added to the formulation as a diluent to adjust the flow and viscosity properties of the modified enamel formulation to that required for commercial coating specifications, namely a 50 seconds viscosity, Zahn #2 cup.

The enamel coating formulation was applied, by means of a draw bar, to the surface of a sheet of 95 lb. tin-free steel at a dried film weight of 3.5-4.5 mg/sq. in. of steel surface.

After application of the modified enamel coating formulation, the coated sheet was baked in an oven in a prebake zone at 300° F. for 2 minutes to bring the sheet up to temperature and then at 415° F. for 8 minutes in the bake zone of the oven to volatilize the solvent mixture and to cure the resin solids mixture to a hard enamel film.

After cooling, the enamel coated sheet was cut into 1×4 inch strips. A closure member having a laminate structure of 3.0 to 4.0 mil aluminum foil coated with a 1.5 to 2.0 mil layer of a polypropylene resin having a melt index of 0.55 and a density of 0.90 was heat sealed to the enamel coated strips at 400° F. with the polypropylene layer in contact with the enamel coated surface at a 4 second dwell time and 40 lbs/sq. in. pressure. The closure member heat sealed to the strip was allowed to cool to room temperature.

The heat sealed portion of the closure member was then tested to determine the peel force required to separate the closure member from the enamel coated strip. The peel strengths necessary for commercial acceptance are in the range of 4 to 9 lbs/lineal inch (PLI). The test was performed using an Amtor peel tester which applied a constant strain rate of 12 lineal inches per minute on the closure member. The peel forces required to separate the closure member after a regular bake (Reg. Bake) are summarized in Table 1 below.

The procedure of Example 1 was then repeated with the exception that during the baking of the enamel coated sheets the sheets were exposed to the prebake zone for an additional 4 minutes to simulate an oven stop.

The peel forces required to separate the closure member after an extended oven exposure in the preheat zone (after oven stop) are also recorded in Table I.

For purposes of comparison, the procedure of Example I was repeated with the exception that a butene polymer was not incorporated in the enamel coating or an adjuvant not within the scope of the present invention was substituted for the butene polymer in the enamel coating formulation. The peel force required to separate the closure member in these comparative runs are also recorded in Table I, designated by the symbol "C".

TABLE I

| | | | (1) Average Peel Value (PLI) | |
|---|---|---|---|---|
| Run No. | INDOPOL Adjuvant | Percent by Wt. | After Reg. Bake | After Oven Stop |
| 1 | L-50 | 3.6 | 8.3 | 7.1 |
| 2 | L-100 | 3.6 | 14.1 | 12.5 |
| 3 | L-100 | 5.4 | 10.2 | 11.3 |
| 4 | L-100 | 7.2 | 7.4 | 9.5 |
| 5 | L-14 | 5.4 | 28.0 | 23.3 |
| 6 | H-1900* | 1.5 | 12.9 | 7.4 |
| 7 | H-1900* | 3.0 | 7.4 | 3.6 |
| $C_1$ | None (control) | — | 6.6 | 1.4 |
| $C_2$ | Dixylylethane | 8 | 7.5 | 2.2 |
| $C_3$ | Oleyl alcohol | 23.3 | 7.9 | 3.9 |
| $C_4$ | Isopar M (Kerosene)* | 20.0 | 9.4 | 3.3 |
| $C_5$ | Mineral Oil** | | | |

(1) Average of 5 tests
*Causes some dewetting
**Dewets (incompatible)

The data in Table I indicates that the addition of 1.5 to 7.2 percent by weight butene polymer to the enamel coating avoids the low peel values obtained with sheets exposed to oven stops.

EXAMPLE II

The procedure of Example I was repeated using L-50 as the stabilizing adjuvant at a concentration of 5.4-7.2 percent by weight. The peel values after a regular bake exposure and after a simulated 3 minute oven stop in the prebake zone are recorded in Table II below.

TABLE II

| | | After Reg. Bake | | After Oven Stop | |
|---|---|---|---|---|---|
| Run No. | Percent Polybutene L-50 | Average Peel Value PLI | Peel Value Range PLI | Average Peel Value PLI | Peel Value Range PLI |
| 1 | 0 | 9.4 | 0.6–14.0 | 8.4 | 7.4–10.2 |
| 2 | 5.4 | 7.3 | 2.8–11.0 | 7.1 | 5.6–7.8 |
| 3 | 7.2 | 7.7 | 2.8–9.6 | 7.2 | 5.0–9.0 |

What is claimed is:

1. A method of bonding a propylene polymer to an enamel coated metal surface to obtain a seal of controlled detachability between the propylene polymer and the enamel coated metal surface, the method comprising applying to a metal surface an enamel coating comprised of an epoxy resin and an aminoplast resin having incorporated therein an adhesion promoting amount of a carboxylated polypropylene resin and a heat stabilizing amount of a butene polymer;

baking the enamel coating to cure and harden the coating;

heat sealing a propylene polymer layer to the hardened enamel coated metal surface and then cooling the heat sealed assembly to ambient temperature whereby a seal of controlled detachability is obtained between the heat sealed surfaces.

2. The method of claim 1 wherein the butene polymer has a molecular weight of about 300 to 2500.

3. The method of claim 1 wherein the butene polymer has a molecular weight of about 300 to 1000.

4. The method of claim 1 wherein the butene polymer is polybutene.

5. The method of claim 1 wherein the butene polymer is polyisobutylene.

6. The method of claim 1 wherein the carboxyl modified polypropylene resin is the reaction product of polypropylene and an unsaturated dicarboxlic acid or anhydride containing about 0.1 percent to about 5.0 percent by weight carboxyl groups.

7. The method of claim 6 wherein the unsaturated anhydride is maleic anhydride.

8. The method of claim 1 wherein the enamel coating is comprised of an epoxy resin and a urea formaldehyde resin.

9. The method of claim 1 wherein the enamel coating is a solids mixture comprised of about 70 to about 90 percent by weight of an epoxy resin, about 5 to about 25 percent by weight of a urea formaldehyde resin, about 0.1 to 5 percent by weight of the carboxylated polypropylene resin and about 1.5 to 10 percent by weight of the butene polymer resin.

10. The method of claim 1 wherein the propylene polymer is polypropylene.

11. An enamel coating comprised of a solids mixture comprised of about 70 to about 90 percent by weight of an epoxy resin, about 5 to about 25 percent by weight of a urea formaldehyde resin, about 0.1 to 5 percent by weight of a carboxylated polypropylene resin and about 1.5 to 10 percent by weight of a butene polymer resin.

12. The enamel coating of claim 11 wherein the butene polymer has a molecular weight of about 300 to 2500.

13. The enamel coating of claim 1 wherein the butene polymer has a molecular weight of about 300 to 1000.

14. The enamel coating of claim 1 wherein the butene polymer is polybutene.

15. The enamel coating of claim 1 wherein the butene polymer is polyisobutylene.

16. The enamel coating of claim 11 wherein the carboxylated polypropylene resin is the reaction product of polypropylene and an unsaturated dicarboxylic acid or anhydride containing about 0.1 percent to about 5.0 percent by weight carboxyl group.

17. The enamel coating of claim 11 wherein the unsaturated anhydride is maleic anhydride.

18. The enamel coating of claim 11 wherein the butene polymer has a molecular weight of 300 to 2500.

19. The enamel coating of claim 11 wherein the butene polymer has a molecular weight of 300 to 1000.

* * * * *